(12) United States Patent
Du et al.

(10) Patent No.: US 11,220,820 B2
(45) Date of Patent: Jan. 11, 2022

(54) CROSS-LAMINATED TIMBER DECORATIVE PANEL AND CONNECTING DEVICE THEREOF

(71) Applicant: SOUTHWEST FORESTRY UNIVERSITY, Kunming (CN)

(72) Inventors: Guanben Du, Kunming (CN); Chunlei Dong, Kunming (CN)

(73) Assignee: SOUTHWEST FORESTRY UNIVERSITY, Kunming (CN)

(*) Notice: Subject to any disclaimer, the term of this patent is extended or adjusted under 35 U.S.C. 154(b) by 0 days.

(21) Appl. No.: 16/833,769

(22) Filed: Mar. 30, 2020

(65) Prior Publication Data

US 2020/0325682 A1 Oct. 15, 2020

(30) Foreign Application Priority Data

Apr. 10, 2019 (CN) .......................... 201910286215.7

(51) Int. Cl.
*E04B 1/70* (2006.01)
*E04C 2/26* (2006.01)
(Continued)

(52) U.S. Cl.
CPC .................. *E04C 2/26* (2013.01); *B32B 3/06* (2013.01); *B32B 3/266* (2013.01); *B32B 21/04* (2013.01); *E04B 1/40* (2013.01); *B32B 2255/08* (2013.01); *B32B 2307/7246* (2013.01); *B32B 2419/04* (2013.01); *E04B 2103/04* (2013.01)

(58) Field of Classification Search
CPC .......... E04F 15/02033; E04F 15/02038; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 15/046; E04F 2201/0511; B32B 21/04; B32B 3/06; B32B 3/266; B32B 2255/08; B32B 2419/04; B32B 2307/7146; E04B 1/40; E04B 1/6162; E04B 2001/6195;
(Continued)

(56) References Cited

U.S. PATENT DOCUMENTS 10,260,232 B1* 4/2019 Conboy .................... B27K 3/52
2008/0124576 A1* 5/2008 Elliott ........................ C08J 5/24
428/702
(Continued)

*Primary Examiner* — Chi Q Nguyen
(74) *Attorney, Agent, or Firm* — Rimon PC

(57) ABSTRACT

A cross-laminated timber (CLT) decorative panel and a connecting device thereof are provided, and belongs to the field of construction materials. The CLT decorative panel includes a first decorative layer, a buffer layer, a CLT layer and a second decorative layer, where the first decorative layer, the buffer layer, the CLT layer and the second decorative layer are sequentially arranged from top to bottom, and the buffer layer is internally provided with a non-Newtonian fluid. The connecting device includes a support body and a connecting block arranged on the support body; the support body has a rectangular solid structure; a cross section of the support body is square with a side length the same as a thickness of the decorative panel; the connecting block is fit with the connecting groove.

8 Claims, 4 Drawing Sheets

(51) Int. Cl.
*B32B 3/06* (2006.01)
*B32B 3/26* (2006.01)
*B32B 21/04* (2006.01)
*E04B 1/41* (2006.01)

(58) Field of Classification Search
CPC ........ E04B 2103/04; E04B 1/98; E04C 2/526; E04C 2/26
USPC .. 52/302.1, 592.1, 592.3, 592.2, 578, 588.1, 52/309.3
See application file for complete search history.

(56) References Cited

U.S. PATENT DOCUMENTS

| | | | |
|---|---|---|---|
| 2009/0266025 A1* | 10/2009 | Toas | E04B 1/80 52/741.4 |
| 2009/0313931 A1* | 12/2009 | Porter | B32B 7/12 52/309.4 |
| 2010/0281784 A1* | 11/2010 | Leo | E04B 1/30 52/16 |
| 2012/0073225 A1* | 3/2012 | Douglass | E04C 3/29 52/309.4 |
| 2013/0081347 A1* | 4/2013 | Dewar | E04C 2/24 52/588.1 |
| 2014/0117452 A1* | 5/2014 | Abou-Khalil | H01L 29/0615 257/360 |
| 2016/0243789 A1* | 8/2016 | Baroux | B32B 29/002 |
| 2017/0210098 A1* | 7/2017 | Moore | B32B 23/04 |
| 2020/0189242 A1* | 6/2020 | Cai | B32B 9/047 |
| 2020/0338867 A1* | 10/2020 | Luttwak | B32B 5/18 |

* cited by examiner

CROSS-LAMINATED TIMBER DECORATIVE PANEL AND CONNECTING DEVICE THEREOF

RELATED APPLICATIONS

This application claims the benefit of priority from Chinese Application No. 201910286215.7 filed Apr. 10, 2019, the disclosures of which are incorporated herein by reference in their entirety.

TECHNICAL FIELD

The present invention relates to the field of building materials, and in particular, to a cross-laminated timber (CLT) decorative panel and a connecting device thereof.

BACKGROUND

Cross-laminated timber (CLT) is usually made from a set of boards with a certain thickness, which are laid up by gluing or nailing/tenoning perpendicular to each other according to the grain direction of the adjacent layer. The surface and inner layers of boards are arranged symmetrically on both sides of the center layer or core of the boards. Each layer of board is usually lengthened by end joint by finger joint or nailing and widened by edge joint by gluing or nailing, and the layers are usually combined by gluing.

CLT can be widely used in the wall, floor and roof parts of civil buildings and commercial high-rise buildings, and plays a dual role of building envelope and load bearing in the building. CLT buildings are one of the types of prefabricated wooden structures that China strongly advocates because of their advantages such as high degree of factory customization/prefabrication, simple on-site assembly, high efficiency, environmental friendliness, earthquake resistance and fire prevention.

However, the CLT panel in the prior art still has some defects. On the one hand, because the CLT panel is pressed from logs, the outer surface is of a log color, and the decoration is poor. Therefore, a building needs redecoration after assembled. However, due to the particularity of the wooden structure, it cannot be decorated flexibly like a reinforced concrete building. The way of its decoration is much more limited, which affects the aesthetics. On the other hand, because the CLT panel is pressed from logs, its impact resistance is poor. Due to the low surface hardness, when the CLT panel is used as a floor, once the CLT panel is impacted by a falling heavy object or is impacted in other ways, it often causes a pit or crack on the floor. In addition, as the CLT panel is an integral structure, it is not easy to repair like a concrete floor. The repair requires replacement of the entire CLT panel, which is difficult to maintain and costly.

In addition, in the prior art, when a CLT floor is connected to a vertical panel, the vertical panel is usually erected on the floor and connected by using an L-shaped connection member and a bolt. This connection is only reinforced by the bolt. However, the connection strength of the bolt depends on the strength of the CLT panel itself. In case the floor and the vertical panel are reconnected after the bolt is removed, the connection strength will be greatly reduced due to the deformation of the CLT panel, and the contact surface of the floor and the vertical panel is prone to damage. During the reconnection, the vertical panel is difficult to position, and multiple adjustments are required to ensure the accurate positioning of the vertical panel.

SUMMARY

The present invention provides a cross-laminated timber (CLT) decorative panel, which solves the problems of poor decoration and weak impact resistance of a CLT panel in the prior art.

The present invention further provides a connecting device for the CLT decorative panel, which facilitates the positioning when connecting a floor or a roof and improves the connecting strength.

A CLT decorative panel, including:
a first decorative layer;
a buffer layer;
a CLT layer; and
a second decorative layer; where
the first decorative layer, the buffer layer, the CLT layer and the second decorative layer are sequentially arranged from top to bottom, and the buffer layer is internally provided with a non-Newtonian fluid.

More preferably, the buffer layer is formed by coating the non-Newtonian fluid with a flexible coating membrane.

More preferably, the buffer layer is provided with a yield hole.

More preferably, a connecting groove is formed on a side surface of the decorative panel.

More preferably, the connecting groove is multiple, and multiple connecting grooves are arranged at intervals.

More preferably, the connecting groove is formed on the CLT layer.

More preferably, the decorative panel further includes a waterproof/breathable membrane; the waterproof/breathable membrane is located between the CLT layer and the second decoration layer; the second decoration layer is provided with a ventilation hole.

A connecting device for connecting the above-mentioned CLT decorative panel, the connecting device including a support body and a connecting block arranged on the support body, where the support body has a rectangular solid structure; a cross section of the support body is square with a side length the same as a thickness of the decorative panel; the connecting block is fit with the connecting groove.

More preferably, the connecting block is provided with a threaded hole.

The present invention provides a CLT decorative panel, which prefabricates a decorative layer when manufactured in a factory, which improves a decorative effect and reduces the difficulty of later decoration. When impacted, a non-Newtonian fluid in a buffer layer instantly increases an impact resistance and disperses a single-point impact force to the entire CLT panel, thereby protecting the CLT panel from a uniformly distributed damage caused the impact force.

The present invention further provides a connecting device for the CLT decorative panel. By fitting with a connecting groove of the CLT decorative panel, the connecting device is convenient for positioning during installation. The connecting device uses a connecting block to enhance a connection strength. The connecting block transfers part of a connection stress of the CLT panel to the connecting device, thereby reducing the strength requirement of the CLT panel by the structural strength of the connecting device.

REFERENCE NUMERALS

10. first decorative layer, 11. buffer layer, 111. Flexible coating membrane, 112. yield hole, 113. non-Newtonian fluid, 12. CLT layer, 121. first connecting groove, 122. second connecting groove, 13. waterproof/breathable membrane, 14. second decorative layer, 20. connecting device, 21. support body, 22. first connecting block, 221. first connecting hole, 23. second connecting block, and 231. second connecting hole.

DETAILED DESCRIPTION

Specific implementations of the present invention are described below with reference to accompanying drawings. It should be understood that the protection scope of the present invention is not be limited by the specific implementations.

Embodiment 1

Figure 1:
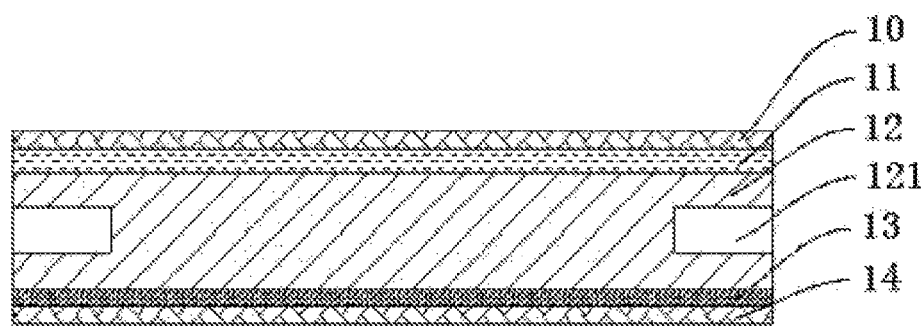
FIG. 1 is a sectional drawing of a cross-laminated timber (CLT) decorative panel provided by the present invention.
Figure 3:
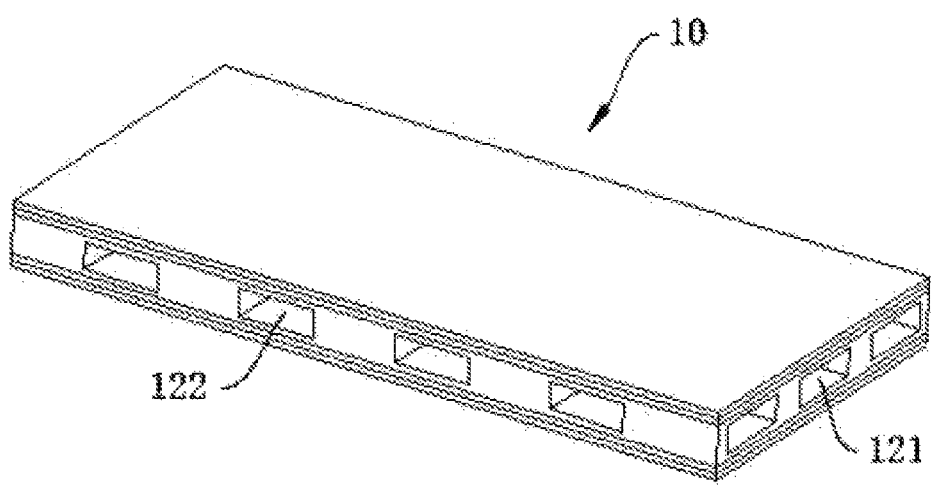
FIG. 3 is a structural diagram of a CLT decorative panel provided by the present invention.

As shown in FIG. 1 and FIG. 3, this embodiment of the present invention provides a CLT decorative panel, including:

a first decorative layer 10;
a buffer layer 11;
a CLT layer 12; and
a second decorative layer 14; where
the first decorative layer 10, the buffer layer 11, the CLT layer 12 and the second decorative layer 14 are sequentially arranged from top to bottom; the first decorative layer 10, the buffer layer 11, the CLT layer 12 and the second decorative layer 14 are connected by gluing; the buffer layer 11 is internally provided with a non-Newtonian fluid 113. The first decorative layer 10 and the second decorative layer 14 can be customized and prefabricated in a factory, which saves the time of later decoration and improves the decoration.

The non-Newtonian fluid 113 refers to a fluid that does not follow Newton's law of viscosity, that is, a fluid whose shear stress and shear strain rate are not linearly related. The non-Newtonian fluid 113 generally includes a concentrated solution and a suspension of a high molecular weight polymer etc. The non-Newtonian fluid 113 includes a solution of polyethylene, polyacrylamide, polyvinyl chloride (PVC), nylon 6, polyvinyl stearate (PVS), celluloid, polyester and rubber, and a melt and solution of various engineering plastics chemical fibers, etc. The non-Newtonian fluid 113 includes petroleum, mud, a coal water slurry, a ceramic slurry, a paper pulp, a paint, an ink, a toothpaste, a silkworm regeneration solution, flushing and completion fluids for drilling, a magnetic paint, a coating liquid for a certain photosensitive material, a foam, a liquid crystal, a hyperconcentrated flow, a debris flow and the mantle, etc. In this embodiment, one or more of the above materials may be used.

When the non-Newtonian fluid 113 is subjected to a rapid impact, its shear strength instantly increases, which well buffers. When an ordinary CLT panel is impacted, the pressure per unit area is large due to a small bearing area. Because the shear strength of the CLT panel is limited, a single-point damage will be caused by a violent impact. When the buffer layer 11 is impacted, the non-Newtonian fluid 113 in the buffer layer increases a shear strength and disperses a single-point impact force to the CLT panel. In this way, the impact force acts in a large area, which reduces the pressure per unit area, and protects the CLT panel from a single-point damage in case of an impact.

Figure 2:
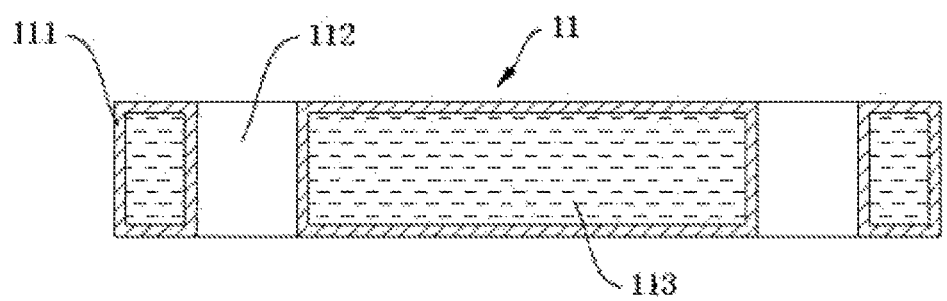
FIG. 2 is a structural diagram of a buffer layer in FIG. 1.

Specifically, the buffer layer 11 is formed by coating the non-Newtonian fluid 113 with a flexible coating membrane 111. As shown in FIG. 2, the flexible coating membrane 111 may be made of a soft PVC material; the non-Newtonian fluid 113 is filled into the flexible coating membrane 111, and then the flexible coating membrane 111 is sealed. When subjected to a slow impact, the flexible coating membrane 111 deforms to avoid damage. The first decorative layer 10 is supported by a flexible material to protect the first decorative layer 10 from damage in case of an impact. In addition to avoiding damage to the CLT layer 12 when subjected to a rapid impact, the buffer layer 11 can also improve comfort.

Specifically, the buffer layer 11 is provided with a yield hole 112 for accommodating a bolt.

Specifically, a connecting groove is formed on a side surface of the decorative panel to fit with the connecting device 20 for positioning.

Specifically, as shown in FIG. 3, the connecting groove is multiple, and the multiple connecting grooves are arranged at intervals. In this embodiment, the CLT decorative panel is rectangular. The CLT decorative panel is provided with a first connecting groove 121 on two opposite sides and a second connecting groove 122 on the other two opposite sides. The connecting grooves are formed on the CLT layer 12.

Embodiment 2

Based on Embodiment 1, this embodiment further includes a waterproof/breathable membrane 13; the waterproof/breathable membrane 13 is located between the CLT layer 12 and the second decoration layer 14; the second decoration layer 14 is provided with a ventilation hole. Because the CLT panel is pressed from solid wood or lumber, the CLT panel will expand, deform and rot when it is wet or submerged in water, affecting the life cycle of a building. It is well known that a water vapor floats upward. When the water vapor is generated by boiling water indoors or due to other circumstances, the water vapor will invade upward from the bottom of the CLT decorative panel, and the waterproof/breathable membrane 13 can solve this problem well. The waterproof/breathable membrane 13 is a new type of high polymer waterproof material, which is mainly used for the building of steel construction and wooden construction. A water particle in the water vapor is small. According to a principle of capillary motion, the water particle can smoothly permeate to the other side of a capillary, which is the permeation of the water vapor. When the water vapor condenses into a water droplet, the particle becomes larger. Due to a surface tension of the water droplet (water molecules "pull against each other"), the water molecules cannot smoothly escape from the water droplet to permeate to the other side, thereby preventing the permeation of water. Therefore, the breathable membrane has a waterproof function. In this way, the waterproof/breathable membrane 13 prevents water from entering the CLT decorative panel. Meanwhile, a water vapor may infiltrate into the CLT decorative panel through a gap. Thus, the CLT layer 12 needs to communicate with the outside air to achieve "breathing". In this way, the CLT layer 12 removes the water vapor inside to maintain a proper humidity. The waterproof/breathable membrane 13 allows the air to pass to achieve unobstructed ventilation with an external environment. Since there is less water in the CLT layer 12, it will not condense into a water droplet. Instead, a water molecule in the CLT layer escapes through the waterproof/breathable membrane 13, thereby maintaining a proper humidity.

Embodiment 3

Figure 4:
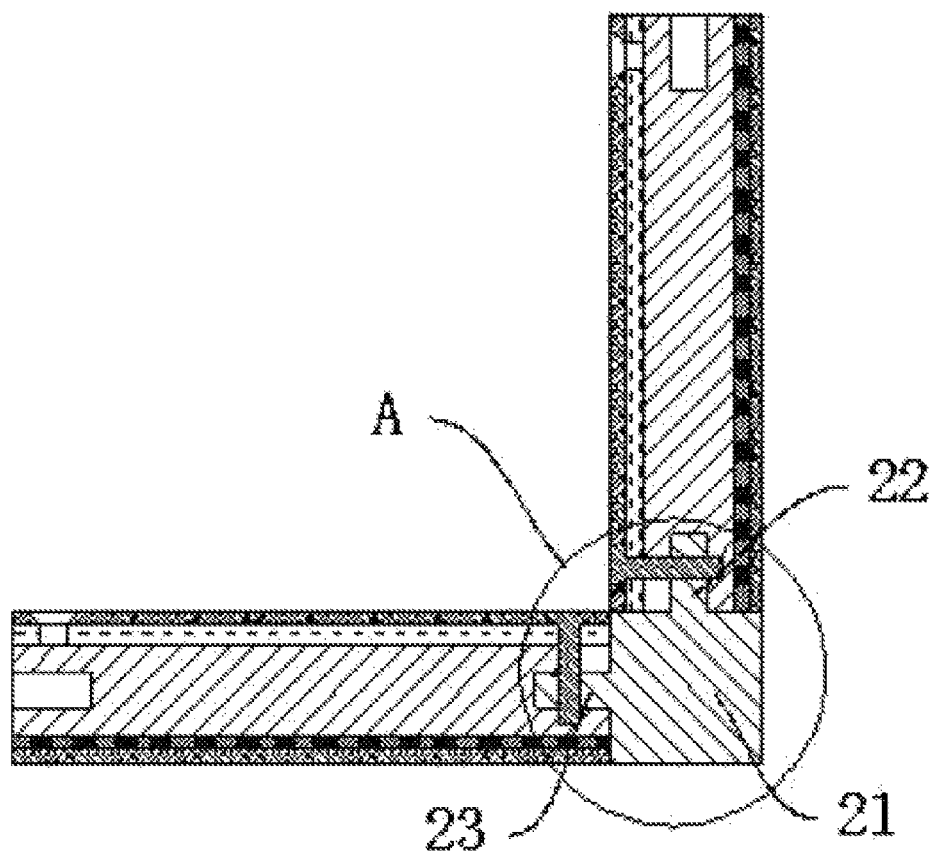
FIG. 4 is an assembly drawing of a CLT decorative panel provided by the present invention.
Figure 5:
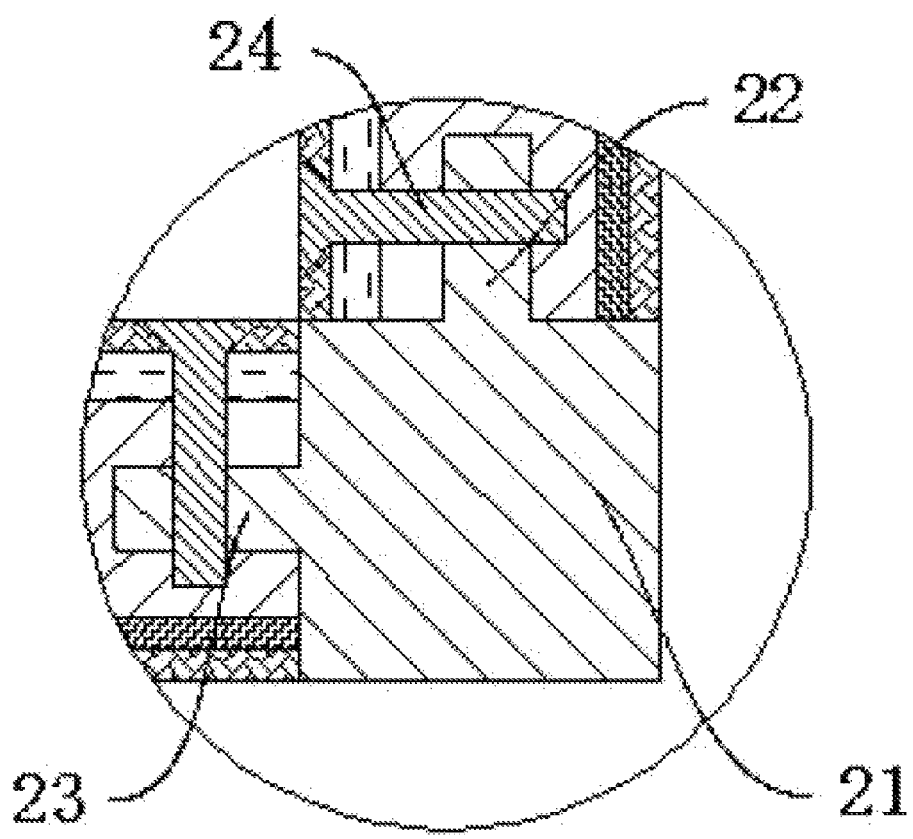
FIG. 5 is a detail drawing of A in FIG. 4.
Figure 6:
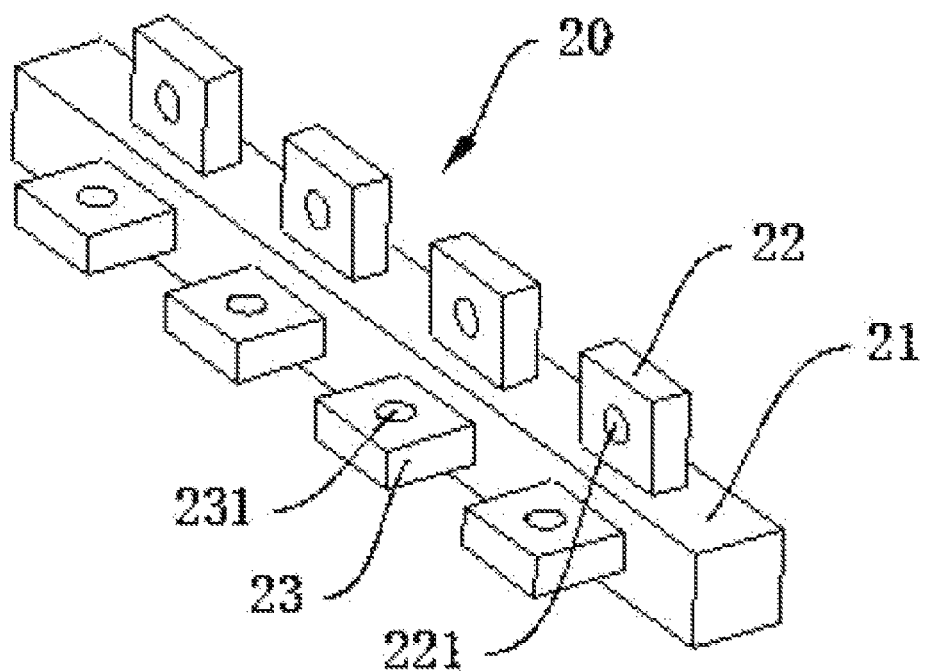
FIG. 6 is a structural diagram of a connecting device in FIG. 4.

As shown in FIG. 4 to FIG. 6, a connecting device 20 for connecting the above-mentioned CLT decorative panel, where the connecting device 20 includes a support body 21 and a connecting block arranged on the support body 21; the support body 21 has a rectangular solid structure; a cross section of the support body 21 is square with a side length the same as a thickness of the decorative panel; the connecting block is fit with a connecting groove. In this embodiment, a first connecting block 22 and a second connecting block 23 are respectively arranged on two adjacent sides of the support body 21. These connecting blocks can be set freely according to actual needs.

During connection, a first connecting groove 121 is fit with the first connecting block 22, and a second connecting groove 122 is fit with the second connecting block 23. This connection realizes the positioning between a floor and a vertical panel and makes the positioning simple and quick. The first connecting block 22 and the second connecting block 23 are respectively inserted into the first connecting groove 121 and the second connecting groove 122 to reinforce the connection. The connection of a traditional CLT panel depending on the strength of the CLT panel itself is changed into the connection depending on the strength of the connecting device 20. As the first connecting block 22 and the second connecting block 23 are inserted into the first connecting groove 121 and the second connecting groove 122, it is not necessary to provide an L-shaped connecting plate at a connection surface, which greatly improves the aesthetics.

Further, the connecting block is provided with a threaded hole. As shown in FIG. 5, a first connecting hole 221 is opened on the first connecting block 22 and a second connecting hole 231 is opened on the second connecting block 23; the first connecting hole 221 and the second connecting hole 231 are both threaded holes; a countersink hole is opened on a first decorative panel to accommodate a bolt to realize the connection. The countersink hole greatly increases a connection strength and provides aesthetics by keeping an end surface of the bolt flush with an end surface of the first decorative panel to prevent a protrusion.

The above disclosed are only a few specific embodiments of the present invention, and the embodiments of the present invention are not limited thereto. Any changes that can be conceived by those skilled in the art should fall into the protection scope of the present invention.

What is claimed is:

1. A cross-laminated timber (CLT) decorative panel, comprising:
   a first decorative layer;
   a buffer layer;
   a CLT layer; and
   a second decorative layer; wherein
   the first decorative layer, the buffer layer, the CLT layer and the second decorative layer are sequentially arranged from top to bottom, and the buffer layer includes a non-Newtonian fluid encapsulated within a sealed flexible coating membrane;
   and further comprising a layer of a waterproof and breathable material located between the CLT layer and the second decorative layer, and the second decorative layer is provided with a ventilation hole.

2. The CLT decorative panel according to claim 1, wherein the buffer layer is provided with a yield hole.

3. The CLT decorative panel according to claim 1, wherein a connecting groove is disposed on a side surface of the decorative panel.

4. The CLT decorative panel according to claim 3, wherein the connecting groove is disposed on the CLT layer.

5. The CLT decorative panel according to claim 1, wherein the connecting groove is one of multiple connecting grooves defined on the side surface of the decorative panel, and the multiple connecting grooves are arranged at intervals.

6. The CLT decorative panel according to claim 1 wherein the layer of a waterproof and breathable material is a polymer material.

7. An assembly comprising:
   two cross-laminated timber (CLT) decorative panels, both panels having a same thickness and a same width, each decorative panel comprising a first decorative layer, a buffer layer, a CLT layer, and a second decorative layer, wherein the first decorative layer, the buffer layer, the CLT layer and the second decorative layer are sequentially arranged from top to bottom, and the buffer layer includes a non-Newtonian fluid encapsulated within a sealed flexible coating membrane, each cross-laminated timber CLT decorative panel including an edge having a number of connecting holes defined therein; and
   a connecting device for joining the CLT decorative panels, the connecting device comprising
   a support body comprising a solid material having a square cross-section perpendicular to a longitudinal axis of the support body, a length of the support body in the direction of the longitudinal axis being equal to the width of the CLT decorative panels, a length of a side of the square cross-section being equal to the thickness of the CLT decorative panels; and
   a number of evenly-spaced connecting blocks disposed on each of two sides of the support body, each connecting block projecting outward from the support body, each connecting block being a rectangular right prism having a major axis oriented parallel to the longitudinal axis of the support body, each connecting block on one of the two sides of the support body being engaged with the number of connecting holes defined in the edge of one of the two cross-laminated timber CLT decorative panels.

8. The assembly of claim 7 wherein each connecting block on a second of the two sides of the support body is engaged with the number of connecting holes defined in the edge of the other of the two cross-laminated timber CLT decorative panels.

\* \* \* \* \*